(12) United States Patent
Paatero

(10) Patent No.: US 10,003,215 B2
(45) Date of Patent: Jun. 19, 2018

(54) UNINTERRUPTED POWER SUPPLY WITH SWITCHABLE REFERENCE

(71) Applicant: ABB Schweiz AG, Baden (CH)

(72) Inventor: Esa-Kai Paatero, Helsinki (FI)

(73) Assignee: ABB Schweiz AG, Baden (CH)

( * ) Notice: Subject to any disclaimer, the term of this patent is extended or adjusted under 35 U.S.C. 154(b) by 101 days.

(21) Appl. No.: 15/262,440

(22) Filed: Sep. 12, 2016

(65) Prior Publication Data

US 2017/0077747 A1 Mar. 16, 2017

(30) Foreign Application Priority Data

Sep. 11, 2015 (EP) ..................................... 15184871

(51) Int. Cl.
*H02J 9/06* (2006.01)
(52) U.S. Cl.
CPC .............. *H02J 9/061* (2013.01); *H02J 9/062* (2013.01); *H02J 2009/063* (2013.01)
(58) Field of Classification Search
CPC ................ H02J 9/061; H02J 2009/063; Y10T 307/615–307/631
See application file for complete search history.

(56) References Cited

U.S. PATENT DOCUMENTS

| 6,100,605 A * | 8/2000 | Zajkowski | H02J 9/06 307/66 |
| 9,337,690 B2 * | 5/2016 | Navarro | H02J 9/062 |
| 2014/0104896 A1 | 4/2014 | Tallam | |
| 2014/0333138 A1 | 11/2014 | Ghosh et al. | |

FOREIGN PATENT DOCUMENTS

DE 102010000502 A1 8/2011

OTHER PUBLICATIONS

European Patent Office, Extended Search Report issued in corresponding Application No. 15184871.0, dated Mar. 4, 2016, 6 pp.

* cited by examiner

*Primary Examiner* — Fritz M Fleming
(74) *Attorney, Agent, or Firm* — Taft Stettinius & Hollister LLP; J. Bruce Schelkopf

(57) ABSTRACT

An uninterrupted power supply device is disclosed having an at least 3-phase AC power supply input for connection of an AC power supply, a DC power supply input for connection of a DC power supply, a power output for connection of a load, a power conversion unit, which interconnects the AC power supply input, the DC power supply input and the power output, whereby the uninterrupted power supply device comprises a secondary control reference, a measurement unit for measuring a voltage difference between the internal control reference and the secondary control reference, and a switching unit for connecting the internal control reference to the secondary control reference when the measured voltage difference is bigger than a threshold voltage and the AC power supply is disconnected from the uninterrupted power supply device.

20 Claims, 12 Drawing Sheets

(State of the Art)

US 10,003,215 B2

UNINTERRUPTED POWER SUPPLY WITH SWITCHABLE REFERENCE

TECHNICAL FIELD

The present invention relates to the area of uninterrupted power supply devices comprising an at least 3-phase AC power supply input for connection of an AC power supply, a DC power supply input for connection of a DC power supply, a power output for connection of a load, a power conversion unit, which interconnects the AC power supply input, the DC power supply input and the power output, and an internal control reference for the power conversion unit. Furthermore, the present invention relates to a respective power supply system. Still further, the present invention relates to an uninterrupted power supply system comprising at least two of the above uninterrupted power supply devices. Still further, the present invention relates to a method for operation of an uninterrupted power supply device.

Uninterrupted power supply devices are also known under the term uninterruptible power supply devices, both abbreviated as UPS.

BACKGROUND ART

In uninterrupted power supply (UPS) devices and systems two installation types are commonly used, one installation type for three-wire AC power supplies and another installation type for four-wire AC power supplies. The two installation types both refer to a three-phase alternate current and differ in the presence of a Neutral N wire provided by the AC power supply in case of the four-wire AC power supply.

Such a typical UPS device 10 according to the state of the Art can be seen in FIG. 1. The UPS device 10 comprises an AC power supply input 12, which is connected to an AC power supply 14. The AC power supply 14 is a 4-phase AC power supply 114 including Neutral N. The AC power supply 14 is connected to the AC power supply input 12 via a disconnect device 16, which is provided to disconnect all four phases including Neutral N. The UPS device 10 further comprises a DC power supply input 18 for connection of a DC power supply 20 and a power output 22 for connection of a load 24.

For providing power to the load 24, the UPS device 10 comprises an AC/DC converter 26, also referred to as rectifier, which is connected to the AC power supply input 12 to receive AC power from the AC power supply 14, a DC/DC converter 28, which is connected to the DC power supply input 18 to receive DC power from the DC power supply 20, and a DC/AC converter 30, also referred to as inverter, which is connected to the power output 22 to provide AC power to the load 24. The AC/DC converter 26, the DC/DC converter 28, and the DC/AC converter 30 are interconnected by a DC link 32. The DC link 32 comprises a storage capacitor 34 for buffering. The AC/DC converter 26, the DC/DC converter 28, and the DC/AC converter 30 with the DC link 32 form a power conversion unit 38. Instead of the DC/AC converter 30, a DC/DC converter can be used to power a DC load.

In case of failures on a side of the load 24, e.g. a short circuit, it can be required to provide a current to the load 24 which is sufficient to trigger load side protection means, since the current through the DC/AC converter 30 is limited based on the semiconductor components. This is typically achieved by a bypass connection 39, which is provided with a bypass switch 40. The bypass connection 39 is connected to an alternate AC power supply 41, which provides a current to the load 24 in case of failure to trigger protection means at a load side of the UPS device 10 and to clear the fault. In this embodiment, an additional switch 42 is provided to connect and disconnect the alternate AC power supply 41.

The UPS device 10 further comprises a control unit 44, which controls all components of the UPS device 10. The control unit 44 has an internal control reference for all voltage measurements. The internal control reference typically is a potential that is stable under normal operating conditions. One typical voltage frequently used as internal control reference is e.g. the internal Neutral N.

Furthermore, the UPS device 10 comprises a user interface and a communication interface 46, which are depicted together as one component in FIG. 1. However, in alternative embodiments, the user interface and the communication interface 46 can be individual components. The communication interface is used e.g. for communication of different UPS devices when operated together as a UPS system, which is not shown in FIG. 1.

The installations for UPS devices and systems are usually according to a pre-determined configuration or installation class, e.g. grounded (TN-S/-C) or floating (IT). The UPS device 10 shown in FIG. 1 comprises an installation as TN-S, grounded 4-wire with Neutral and Ground routed to equipment as separate conductors. This corresponds to standard European installation practice. Change of the installation from one class to another during operation is usually not recommended and under some conditions even not allowed, since such a change may introduce a direct safety risk and/or place unintentional and excessive stress on components.

However, for instance for the very common 4-wire TN-S installation, it is possible and sometimes even a regional requirement to have an external disconnect device at the AC power system input, which switches all poles of the AC power supply including neutral. The operation of the disconnect device will turn the UPS device to power the load from the DC power source connected to the DC power supply input. Additionally, the installation of the UPS device turns to IT because of the removal of installation reference from load side.

The above installation problem could be overcome by a fixed or hardwired load reference connection, e.g. to Neutral or ground, under varying modes of operation. However, the load reference connection is optional and depends e.g. on application specific and/or regional requirements. Accordingly, there is no universal solution to fix the above installation problem.

A special area of application is UPS devices and involving generators or other separately derived sources that may introduce a detrimental change of control or safety reference during or after a change of power source or the mode of operation.

The above principles have been discussed in respect to UPS devices. However, the same principles apply to UPS systems, which comprise multiple UPS devices.

UPS are for example known from US 2014/333138 A1, US 2014/104896 A1 or DE 10 2010 000 502 A1.

DISCLOSURE OF INVENTION

It is an object of the present invention to provide an uninterrupted power supply device, an uninterrupted power supply system comprising at least two uninterrupted power supply devices, and a method for operation of an uninterrupted power supply device, which overcome at least some of the above problems, which reduce safety risks and/or reduce unintentional and excessive stress on components of the UPS device or the UPS system in case of disconnection of the AC power supply, and which provide flexibility in design and setup of uninterrupted power supply devices and systems.

This object is achieved by the independent claims. Advantageous embodiments are given in the dependent claims.

In particular, the present invention provides an uninterrupted power supply device comprising an at least 3-phase AC power supply input for connection of an AC power supply, a DC power supply input for connection of a DC power supply, a power output for connection of a load, a power conversion unit, which interconnects the AC power supply input, the DC power supply input and the power output, and an internal control reference for the power conversion unit, whereby the uninterrupted power supply device comprises a secondary control reference, a measurement unit for measuring a voltage difference between the internal control reference and the secondary control reference, and a switching unit for connecting the internal control reference to the secondary control reference, whereby the switching unit connects the internal control reference to the secondary control reference when the measured voltage difference is bigger than a threshold voltage and the AC power supply is disconnected from the uninterrupted power supply device.

The present invention also provides an uninterrupted power supply system comprising at least two uninterrupted power supply devices as specified above, whereby the at least two uninterrupted power supply devices are connected in parallel for connection between an AC power supply and a load.

The present invention also provides an uninterrupted power supply system comprising an at least 3-phase system AC power supply input for connection of an AC power supply, a system DC power supply input for connection of a DC power supply, a system power output for connection of a load, at least two uninterrupted power supply devices, which interconnect the system AC power supply input, the system DC power supply input and the system power output, and an internal system control reference for the at least two uninterrupted power supply devices, whereby the uninterrupted power supply system comprises a secondary system control reference, a system measurement unit for measuring a voltage difference between the internal system control reference and the secondary system control reference, and a system switching unit for connecting the internal system control reference to the secondary system control reference, whereby the system switching unit connects the internal system control reference to the secondary system control reference when the measured voltage difference is bigger than a threshold voltage and the AC power supply is disconnected from the uninterrupted power supply system.

The present invention still further provides a method for operation of an uninterrupted power supply device, whereby the uninterrupted power supply device comprises an at least 3-phase AC power supply input for connection of an AC power supply, a DC power supply input for connection of a DC power supply, a power output for connection of a load, a power conversion unit, which interconnects the AC power supply input, the DC power supply input and the power output, and an internal control reference for the power conversion unit, comprising the steps of providing a secondary control reference, measuring a voltage difference between the internal control reference and the secondary control reference, and connecting the internal control reference to the secondary control reference when the measured voltage difference is bigger than a threshold voltage and the AC power supply is disconnected from the uninterrupted power supply device.

The basic idea of the invention is to perform a measurement of the voltage difference between the internal control reference and the secondary control reference to determine a connection status of the AC power supply and the operational status of the uninterruptable power supply (UPS) device or the UPS system. Hence, as long as the AC power supply is connected to the UPS device or system, the voltage difference between the internal control reference and the secondary control reference will be basically zero. Only in cases when the AC power supply is disconnected the voltage difference can increase. Hence, when the operational state of the UPS device or the UPS system requires a connection of a secondary source to provide operational safety, the switching unit is operated to connect the secondary control reference to the internal control reference. The ability to control the connection of the UPS device or the UPS system to the secondary control reference adds intrinsic value to the UPS device or system, because it adds flexibility to the installation based on a standard design of the UPS device or system.

Apparently, the internal control reference and the secondary control reference have to be chosen differently. Furthermore, it is preferred that the secondary control reference remains available in case of disconnection of the AC power supply using the disconnect switch.

It is to be noted that in some cases, at least some of the DC power supply, the AC power supply and a disconnect switch, which is provided between the AC power supply and the AC power supply input, are provided integral with the UPS device or the UPS system. In particular, the DC power supply can be provided integral with the UPS device or the UPS system.

The power conversion unit typically comprises an AC/DC converter, also referred to as rectifier, which is connected to the AC power supply input to receive AC power from the AC power supply, a DC/DC converter, which is connected to the DC power supply input to receive DC power from the DC power supply, and a DC/AC converter, also referred to as inverter, which is connected to the power output to provide AC power to the load. The AC/DC converter, the DC/DC converter, and the DC/AC converter are interconnected by a DC link. A storage capacitor buffers the DC link. In a modified embodiment, a DC/DC converter is used instead of the DC/AC converter. Accordingly, the DC/DC converter provides DC power to the load. In case of a failure of the AC power supply, the power conversion unit switches power supply to maintain the DC link through the DC/DC converter from the DC power supply, so that no load interruption will take place.

The UPS devices can be operated as stand-alone device to provide uninterrupted power. However, when multiple UPS devices are commonly provided in the UPS system, they are typically provided as modules, which can be easily installed in the UPS system and removed upon requirements.

According to a modified embodiment of the invention the internal control reference is a reference out of one of the phases of the power output, one of the phases of the AC power supply input, internal load reference, installation neutral, an internal DC voltage, or system protective earth/ground. This refers also to the respective potentials of the inventive UPS system. Hence, the internal control reference can be any potential without being limited to a particular potential. This enables flexibility for the usage of a standard UPS device or UPS system, since the same hardware can be easily adapted to the needs depending on a particular installation.

According to a modified embodiment of the invention the secondary control reference is a reference out of system protective earth/ground, neutral of an alternative AC power supply not connected to the AC power supply input, load reference of another system or source, a phase voltage of an alternative AC ˆpower supply not connected to the AC power supply input, or a DC voltage of another system or source. This refers also to the respective potentials of the inventive UPS system. This enables flexibility for the usage of a standard UPS device or UPS system, since the same hardware can be easily adapted to the needs depending on a particular installation. With the connection to the secondary control reference being under active control based on measured values of the voltage difference between the internal control reference and the secondary control reference, safety and/or operation of the UPS device or the UPS system does not have to be restricted to a particular type of potentials connected thereto.

According to a modified embodiment of the invention the uninterrupted power supply device comprises a delaying unit, which delays the connection of the internal control reference to the secondary control reference by the switching unit for a set time period. This time period may vary from zero to infinity. Hence, upon detection that the measured voltage difference between the internal control reference and the secondary control reference is bigger than a threshold voltage, the switching unit is not directly triggered to switch. Accordingly, when the switching condition ceases to exist within the set time period, e.g. when the AC power supply is reconnected, the switching unit does not have to be operated at all According to a modified embodiment of the invention the switching unit comprises a bi-directional electronic switching device or an electromechanical switching device, in particular a contactor or a relay. The contactor refers to a high power relay. Depending on the particular needs in respect to switching times, current carrying capability (ampacity), available space, costs, or others, any of the switches can be chosen to fulfill these needs.

According to a modified embodiment of the invention the switching unit has a current carrying capability of up to a current carrying capability of one phase of the AC power supply input. Hence, in case of a failure, the entire current can be dissipated through the switching unit as failure current without damage. Typically, the maximum current of one phase of the of the AC power supply provided at the AC power supply input determines the maximum current as supported by the UPS device or system as a permanent current, hence the UPS device or the UPS system is typically designed to provide an identical current in case of a AC power supply failure.

According to a modified embodiment of the invention the switching unit comprises a current measurement device for measuring a current through the switching unit. Based on the current through the switching unit, an operational state of the load and/or the UPS device or the UPS system can be determined to improve control of the UPS device or the UPS system. Furthermore, faults can be easily detected.

According to a modified embodiment of the invention the uninterrupted power supply device comprises at least one of a dV/dt limiting device, a voltage limiting device, and/or a passive impedance, which are connected in parallel to the switching unit. Hence, in case of failures, different cases of failures can be handled to prevent damage of the switching unit or the UPS device or the UPS system.

According to a modified embodiment of the invention the uninterrupted power supply device comprises neutral generating means for locally generating a neutral within the uninterrupted power supply device and independent from an AC power source connected to the AC power supply input. The generated neutral can be used as internal control reference or as secondary control reference as required.

According to a modified embodiment of the invention the uninterrupted power supply system is adapted to perform a central measurement of the voltage difference between the internal control reference and the secondary control reference, and the switching units of the at least two uninterrupted power supply devices commonly connect the internal control references to the secondary control references when the centrally measured voltage difference is bigger than the threshold voltage and the AC power supply is disconnected from the respective uninterrupted power supply devices. Hence, the UPS system can provide centralized functionality for measuring the voltage difference.

In an alternative embodiment, the UPS devices of the UPS system perform an individual measurement of the voltage between the internal control reference and the secondary control reference. The individual measurement can be performed in addition to the central measurement by the UPS system.

According to a modified embodiment of the invention the uninterrupted power supply system comprises a DC power bus, and the DC power supply input of the at least two uninterrupted power supply devices is commonly connected via the DC power bus to the DC power supply. Hence, the UPS device share one DC power source. However, any combination of individual DC power supplies and shared DC power supplies, which are connected via the DC power bus to multiple UPS devices, can be applied.

According to a modified embodiment of the invention the uninterrupted power supply system comprises a system switching unit for connecting the internal control reference to the secondary control reference, whereby the system switching unit connects the internal control reference to the secondary control reference when the measured voltage difference is bigger than a threshold voltage and the AC power supply is disconnected from the uninterrupted power supply system.

In an alternative embodiment, the UPS devices of the UPS system each comprise a switching unit for connection of the internal control reference to the secondary control reference. The switching unit can be provided in addition to the system switching unit of the UPS system. The switching units of the UPS devices can be controlled individually within the UPS devices, or commonly from a system control of the UPS system.

In a modified embodiment of the invention the method comprises the additional step of disconnecting the internal control reference from the secondary control reference when the measured voltage difference falls below the threshold voltage and/or the AC power supply is connected to the uninterrupted power supply device. Hence, in case the condition for connecting the internal control reference to the secondary control reference is no longer fulfilled, e.g. when the AC power supply is reconnected to the UPS device or the UPS system, the UPS device or the UPS system can return to normal operation.

BRIEF DESCRIPTION OF DRAWINGS

These and other aspects of the invention will be apparent from and elucidated with reference to the embodiments described hereinafter.

In the drawings.

DETAILED DESCRIPTION OF THE INVENTION

Figure 1:
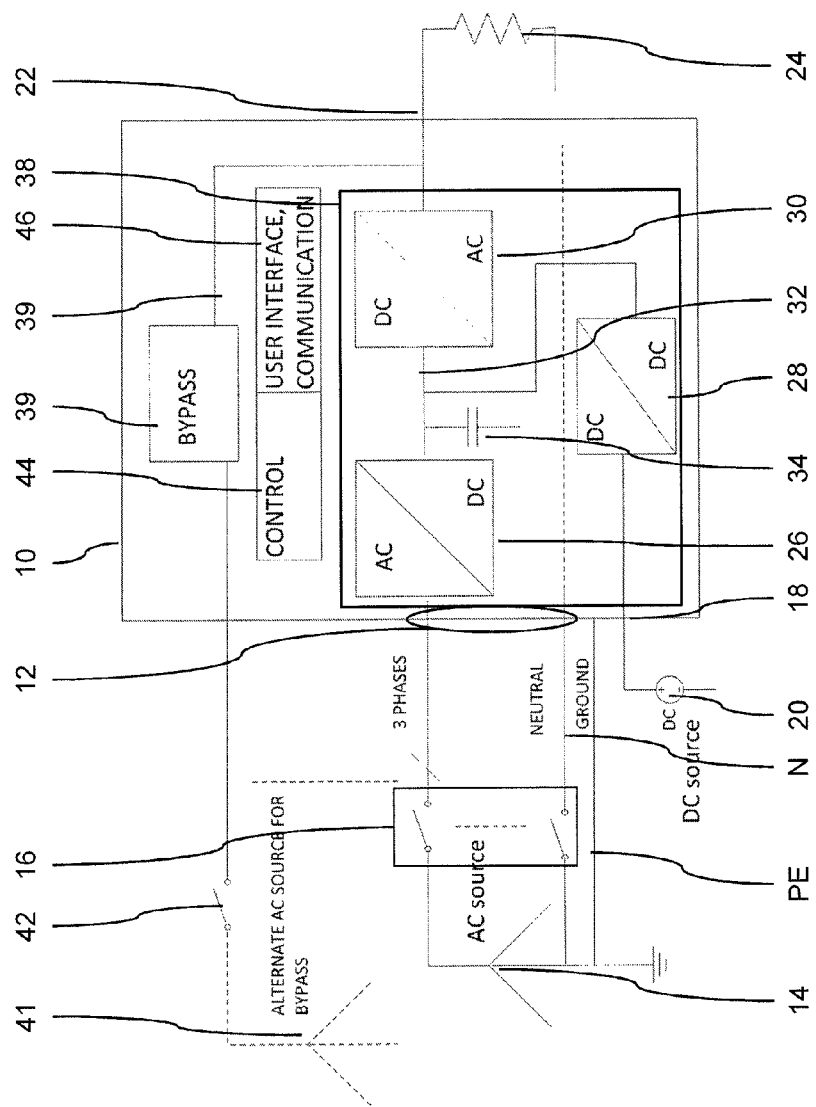
FIG. 1 shows a schematic drawing of a general uninterrupted power supply device according to the state of the Art.
Figure 2:
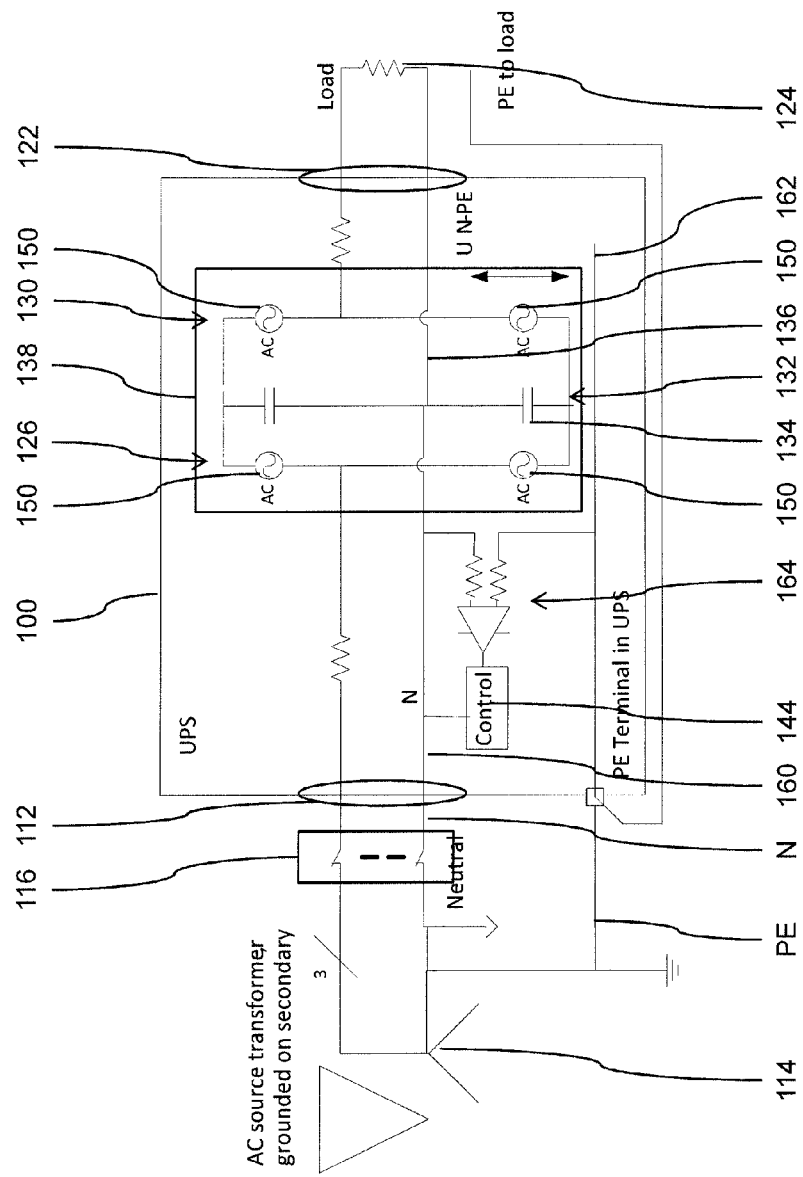
FIG. 2 shows a schematic drawing of an uninterrupted power supply device according to a first, preferred embodiment, as connected to a 4-wire AC power supply.
Figure 4:
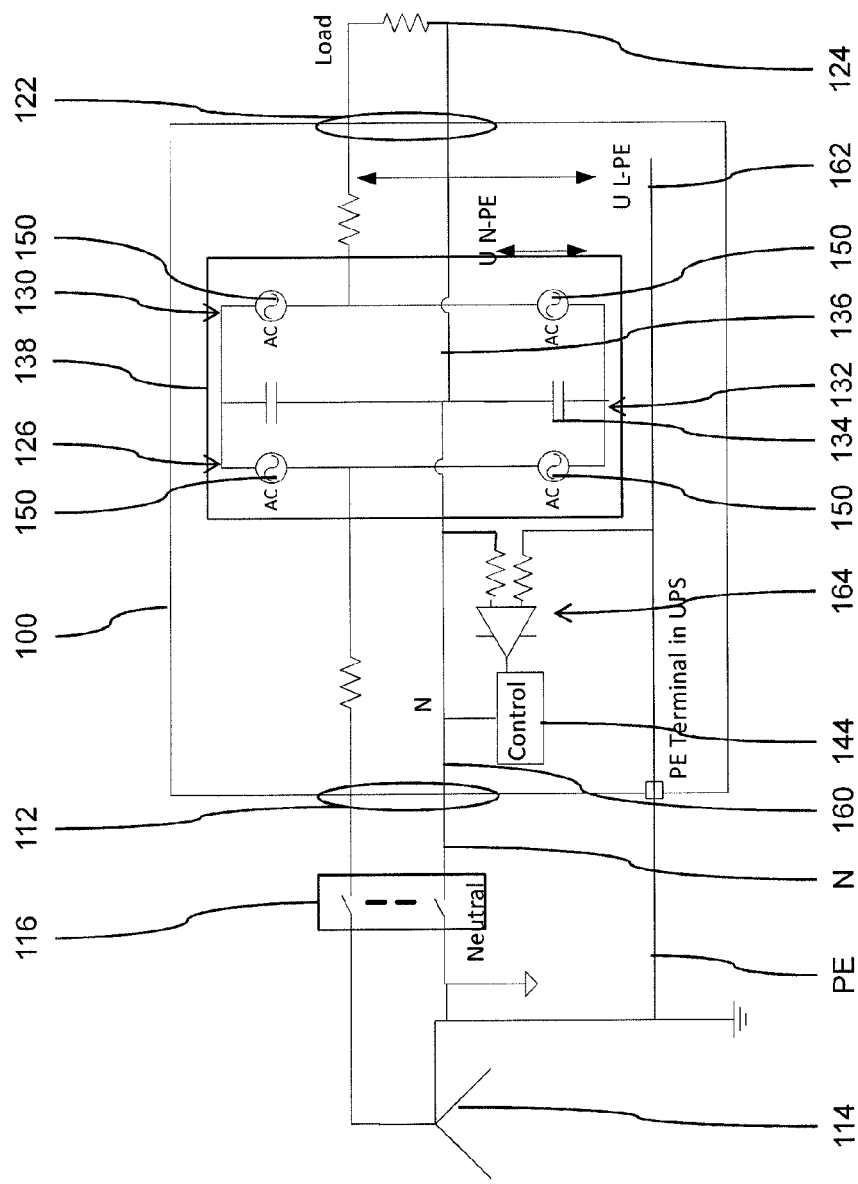
FIG. 4 shows a schematic drawing of the uninterrupted power supply device of the first embodiment in accordance with FIG. 2, whereby the connection to the AC power supply is interrupted by a disconnect device.
Figure 5:
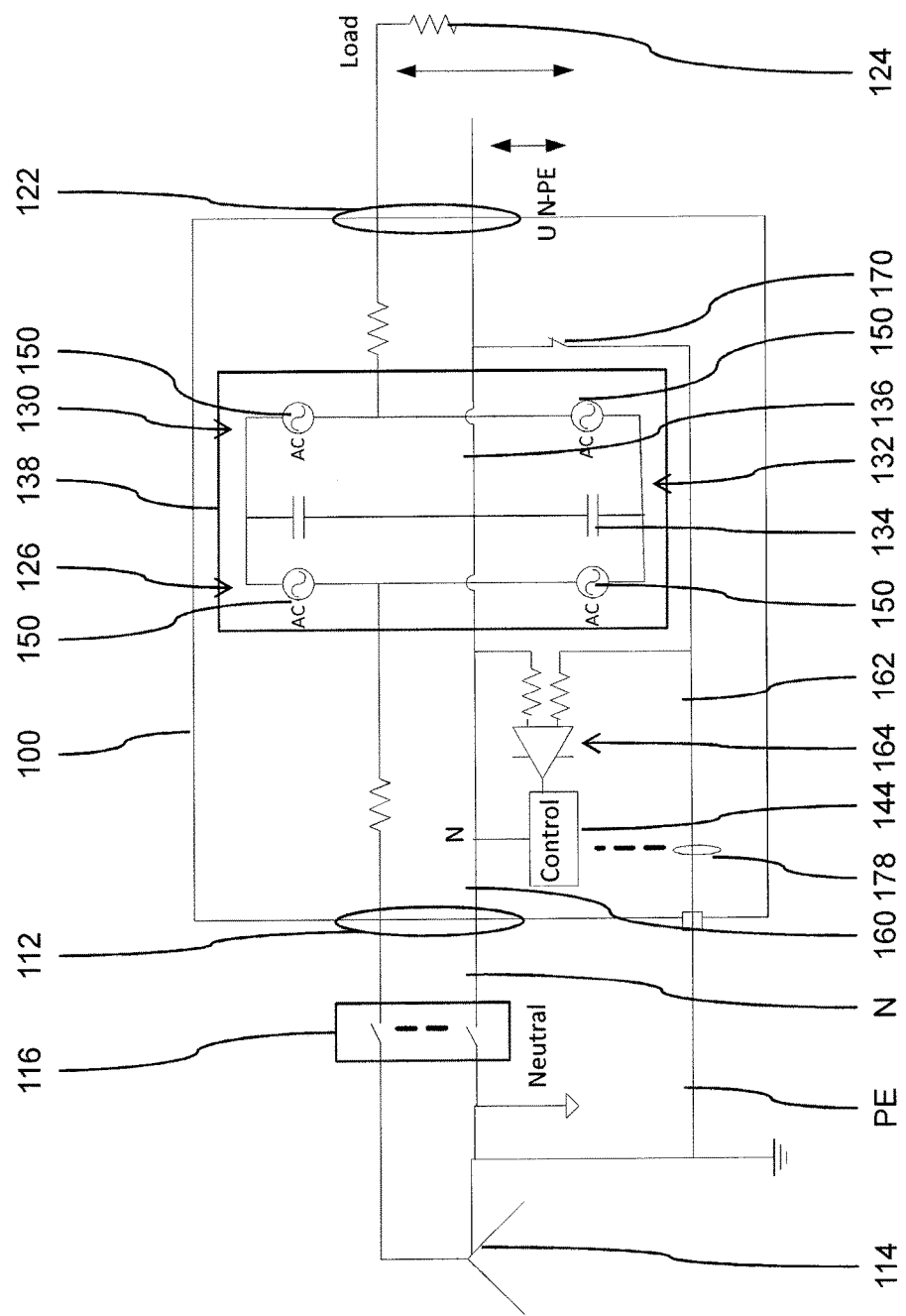
FIG. 5 shows a schematic drawing of the uninterrupted power supply device of the first embodiment in accordance with FIG. 4, whereby the internal control reference is connected via a switching unit to a secondary control reference.

FIGS. 2, 4, and 5 show an uninterrupted power supply (UPS) device 100 according to a first, preferred embodiment. The UPS device 100 comprises an AC power supply input 112, which is connected to an AC power supply 114. The AC power supply 114 is a 4-phase AC power supply including Neutral N in the first embodiment. The AC power supply 114 is connected to the AC power supply input 112 via a disconnect device 116, which is provided to disconnect all four phases of the AC power supply 114, i.e. the three power phases and Neutral N. The UPS device 100 further comprises a power output 122, which is connected to a load 124. Although not shown in FIGS. 2, 4, and 5, the UPS device 100 further comprises a DC power supply input 118 for connection of a DC power supply 120. Details can be seen in FIG. 7 as well as in FIG. 1 where the corresponding DC power supply input 18 is shown.

Figure 3:
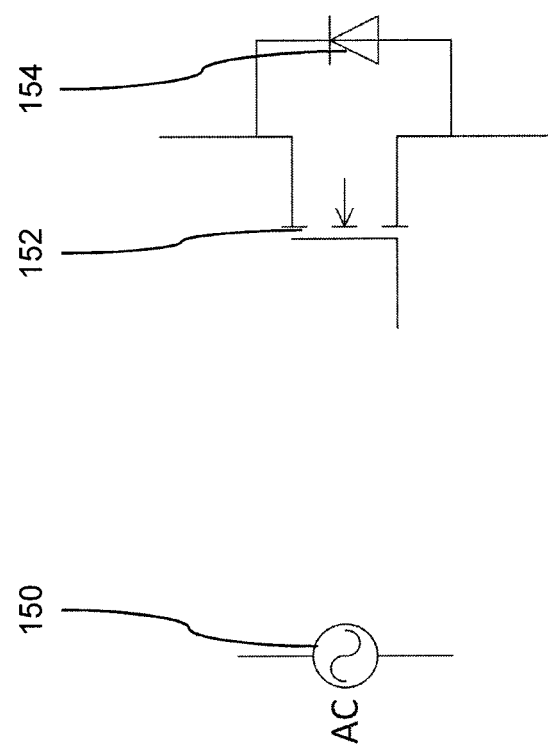
FIG. 3 shows a schematic drawing of a controlled semiconductor switch of the uninterrupted power supply device of the first embodiment.

For providing power to the load 124, the UPS device 100 comprises an AC/DC converter 126, also referred to as rectifier, which is connected to the AC power supply input 112 to receive AC power from the AC power supply 114, and a DC/AC converter 130, also referred to as inverter, which is connected to the power output 122 to provide AC power to the load 124. The AC/DC converter 126 and the DC/AC converter 130 are depicted in 2, 4, and 5 as two controllable semiconductor switches 150. The semiconductor switches 150, which are shown in detail in FIG. 3, comprise in this embodiment each IGBT 152 and a diode 154, which is connected anti-parallel to the IGBT 152.

Furthermore, the UPS device 100 comprises a DC/DC converter 128, which is connected to the DC power supply input 118 to receive DC power from the DC power supply 120. The DC/DC converter 128 is not depicted in FIGS. 2, 4, and 5 to simplify the drawing, but can be seen in FIG. 7, or in FIG. 1 referring to the UPS device 10 of the state of the Art. The AC/DC converter 126, the DC/DC converter 128, and the DC/AC converter 130 are interconnected by a DC link 132. Storage capacitors 134 buffer the DC link 132. The DC link 132 comprises a midpoint 136. The AC/DC converter 126, the DC/DC converter 128, and the DC/AC converter 130 and the DC link 132 are part of a power conversion unit 138.

Furthermore, the UPS device 100 of the first embodiment comprises in accordance with the UPS device 10 of the state of the Art a bypass connection, which is provided with a bypass switch. The bypass connection is connected to an alternate AC power supply, which delivers a current to the load in case of failure to trigger protection means at a load side of the UPS device 100. In this embodiment, an additional switch is provided to connect and disconnect the alternate AC power supply.

The UPS device 100 further comprises a control unit 144, which controls all components of the UPS device 100. The control unit 144 is connected to Neutral N as provided from the AC power supply 114. Hence, in this embodiment, Neutral N of the AC power supply 114 is the internal control reference 160 for all voltage measurements. Hence, the internal control reference 160 is a potential that is stable under normal operating conditions.

As can be further seen in FIGS. 2, 4, and 5, the UPS device 100 is connected to protected earth PE. Protected earth PE serves as secondary control reference 162 in this embodiment.

The UPS device 100 shown in FIGS. 2, 4, and 5 comprises an installation as TN-S, 4-wire with Neutral N and protected earth PE routed to the UPS device 100 separately. A load reference is fixed at protected earth PE of the AC power supply 114 by Neutral N passing through the UPS device 100.

Figure 7:
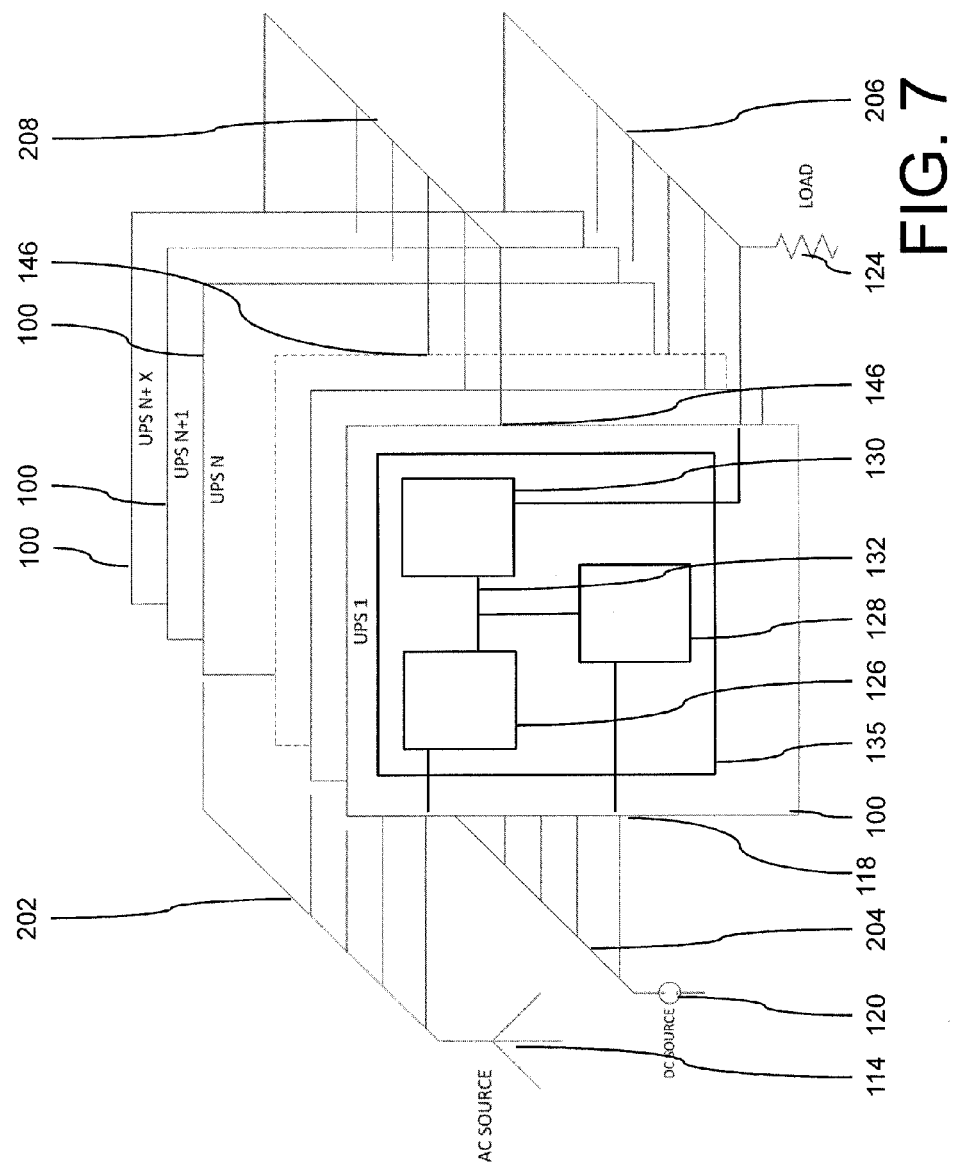
FIG. 7 shows a schematic drawing of an uninterrupted power supply system in accordance with the first embodiment comprising multiple UPS devices.

Furthermore, the UPS device 100 comprises a user interface and a communication interface 146, which is schematically depicted in FIG. 7 for each UPS device 100.

The UPS device 100 of the first embodiment further comprises a measurement unit 164 for measuring a voltage difference between the internal control reference 160 and the secondary control reference 162. The measurement unit 164 is connected to the control unit 144.

As can be seen in FIG. 5 of the first embodiment, the UPS device 100 of the first embodiment also comprises a switching unit 170 for connecting the internal control reference 160 to the secondary control reference 162. The switching unit 170 in this embodiment comprises a bi-directional electromechanical switching device, in particular a contactor or a relay, and has a current carrying capability of up to a current carrying capability of one phase of the AC power supply input 112.

Figure 6:
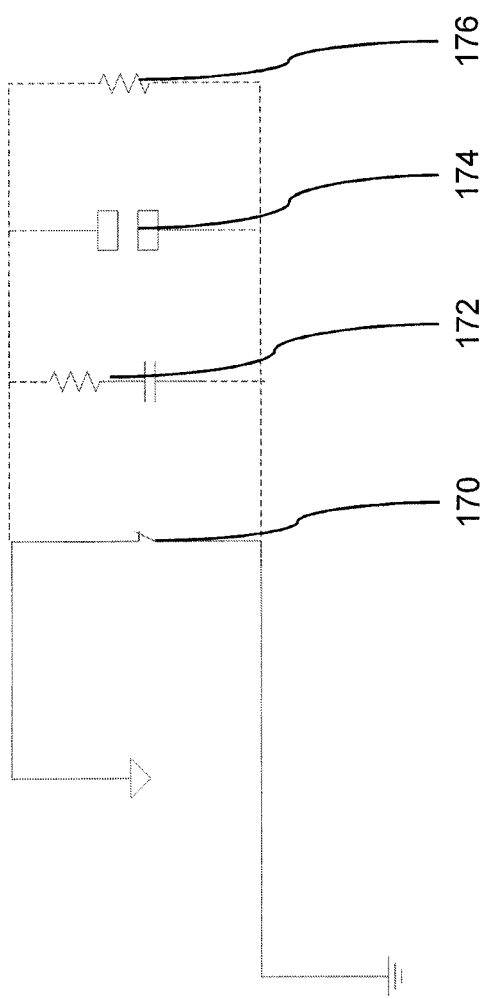
FIG. 6 shows a schematic drawing of the switching unit of the uninterruptable power supply device of the first embodiment with optional protective devices connected in parallel.

As can be seen in FIG. 6, in modified embodiments, the UPS device 100 comprises at least one of a group comprising a dV/dt limiting device 172, a voltage limiting device 174, and a passive impedance 176. In the modified embodiments, the at least one of the dV/dt limiting device 172, the voltage limiting device 174, and the passive impedance 176 is connected in parallel to the switching unit 170.

With reference again to FIG. 5, the switching unit 170 comprises a current measurement device 178 for measuring a current through the switching unit 170. Although shown located apart from the switching unit 170, the current measurement device 178 forms part of the switching unit 170 and measures the current through the switching unit 170.

Figure 12:
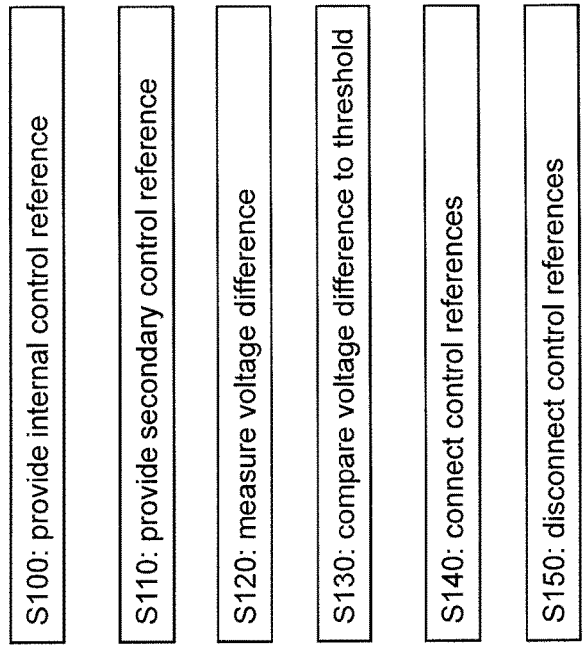
FIG. 12 shows a flow chart of a method for operation of an uninterrupted power supply device in accordance with the above embodiments.

Next will be described a method for operation of an UPS device 100 in accordance with the first embodiment. Reference is made to the flow chart in FIG. 12.

The method starts with step S100. The UPS device 100 is setup as described above and the internal control reference 160 is provided.

Furthermore, according to step S110, the secondary control reference 162 is provided.

In step S120, the measuring unit 164 performs a continuous measurement of the voltage difference between the internal control reference 160 and the secondary control reference 162 to determine a connection status of the AC power supply 114 and the operational status of the UPS device 100.

In step S130 the voltage difference is compared to the threshold. In normal operation of the UPS device 100, which is shown in FIG. 2, the disconnect device 116 closes both the three phases and Neutral N as provided by the AC power supply 114. The load 124 is supported by the AC power supply 114 via the UPS device 100. The control unit 144 controls the operation of the UPS device 100. The measuring unit 164 performs a continuous measurement of a voltage U N-PE between neutral N as internal control reference 160 and protected earth PE as secondary control reference 162. In normal operation, the measured voltage U N-PE is small due to continuity of Neutral N from the AC power supply 114 to the load 124. Hence, the measured voltage U N-PE is below a threshold. Also all voltages of the three phases provided by the AC power supply 114 are within a set threshold.

When the disconnect device 116 disconnects the three phases and Neutral N from the UPS device 100, as can be seen in FIG. 4, the load 124 is being supported by the DC power supply 120 via the UPS device 100. In general, the disconnect device 116 performs the 4-pole disconnect either based on a user action or due to AC power supply 114 failure. After triggering the disconnect device 116, the power conversion unit 138 will start floating with respect to protected earth PE and load reference is lost. When the power conversion unit 138 starts floating, the voltage U N-PE between internal control reference 160 and the secondary control reference 162 has a non-zero value and will be over the threshold based on stray impedances between the load and protected earth PE. Furthermore, due to the disconnect performed by the disconnect device 116, also the source voltage of the phases of the AC power supply input 112 are outside threshold values.

When the measured voltage U N-PE between internal control reference 160 and the secondary control reference 162 is bigger than the threshold and the AC power supply is disconnected from the UPS device 100, method continues with step S140.

In step S140 the control unit 144 of the UPS device 100 triggers the switching unit 170 to interconnect the internal control reference 160 and the secondary control reference 162, as can be seen in FIG. 5, based on the measured voltage difference being bigger than the threshold voltage and the AC power supply 114 being disconnected from the UPS device 100.

In step S150, when the measured voltage difference falls below the threshold voltage and/or the AC power supply 114 is connected to the device 100, the internal control reference 160 is disconnected from the secondary control reference 162. Hence, the control unit 144 triggers the switching unit 170 to open and disconnect the internal control reference 160 and the secondary control reference 162. Accordingly, the disconnect device 116 has been triggered again to connect the phases and Neutral N from the AC power supply to the UPS device 100, so that the phases of the AC power supply input 112 return to be inside the defined threshold values. The method continues with the continuous measurement in step S120.

Next will be described with reference to FIG. 7 an uninterrupted power supply (UPS) system 200 in accordance with the first embodiment. Furthermore, the general principles discussed above in respect to the UPS device 100 of the first embodiment also apply to the UPS system 200 according to the first embodiment.

The UPS system 200 comprises multiple UPS devices 100 as specified above according to the first embodiment. The UPS device 100 of the first embodiment can be operated as stand-alone device to provide uninterrupted power to the load 124. However, when the multiple UPS devices 100 are commonly provided for use in the UPS system 200, they are typically provided as modules, which can be easily installed in the UPS system 200 and removed upon requirements.

As can be seen in FIG. 7, the UPS devices 100 are connected in parallel. Hence, an AC power supply 112 is connected to an AC power bus 202, which connects the AC power supply 114 to the AC power supply inputs 112 of the UPS devices 100. and the load 124. In an alternative embodiment, multiple AC power supplies 114 are connected to the AC power bus 202.

Further, a DC power supply 120 is connected to an DC power bus 204, which connects the DC power supply 114 commonly to the DC power supply inputs 118 of the UPS devices 100. In an alternative embodiment, multiple DC power supplies 120 are connected to the DC power bus 204.

Furthermore, a load 124 is connected to a load power bus 206, which connects the load 124 to the power outputs 122 of the UPS devices 100. In an alternative embodiment, multiple loads 124 are connected to the load power bus 206.

The UPS devices 100 are each provided with a communication interface 146. The communication interfaces 146 of the UPS devices 100 are connected to a communication bus 208.

The further design of the UPS system 200 and the installation of the UPS system to the power supplies 114, 120 and the load 124 is in-line with the principles described above in respect to the UPS device 100 of the first embodiment. Hence, the UPS device can be operated in parallel as described above, whereby each UPS device locally perform a measurement of the voltage U N-PE between internal control reference 160 and the secondary control reference 162 and operates its local switching unit 170 as described above.

However, the UPS devices 100 can synchronize their operation within the UPS system when communicating using the communication bus 208. Hence, when in one of the UPS devices 100 the measured voltage difference between internal control reference 160 and the secondary control reference 162 is bigger than the threshold voltage and the AC power supply 114 is disconnected from the UPS device 100, i.e. the AC power supply 114 is disconnected from the UPS system 200, all UPS devices 100 commonly trigger their switching unit 170 as described above to connect the internal control reference 160 to the secondary control reference 162.

In an alternative embodiment, the UPS system 200 comprise a central measurement device, which is not shown in the figures, to perform a central measurement of the voltage difference between the internal control reference 160 and the secondary control reference 162. In case the centrally measured voltage difference is bigger than the threshold voltage and the AC power supply 114 is disconnected from the respective uninterrupted power supply devices 100, the control units 144 of the UPS devices 100 receive a command via the communication bus 208 and the switching units 170 commonly connect the internal control references 160 to the secondary control references 162.

In a further alternative embodiment, one of the UPS devices 100 of the UPS system 200 performs an individual measurement of the voltage between the internal control reference 160 and the secondary control reference 162 as central measurement. Based on this measurement, when the measured voltage is above the threshold and the AC power supply 114 is disconnected, the control unit 144 of the UPS device 100 which performs the central measurement sends a command to the control units 144 of the other UPS devices 100 via the communication bus 208. Hence, based on this central measurement, the switching units 170 commonly connect the internal control references 160 to the secondary control references 162.

According to modified embodiment the UPS system 200 comprises a system switching unit for connecting the internal control reference 160 to the secondary control reference 162. The system switching unit connects the internal control reference 160 to the secondary control reference 162 when the measured voltage difference is bigger than a threshold voltage and the AC power supply 114 is disconnected from the UPS system 200.

Figure 8:
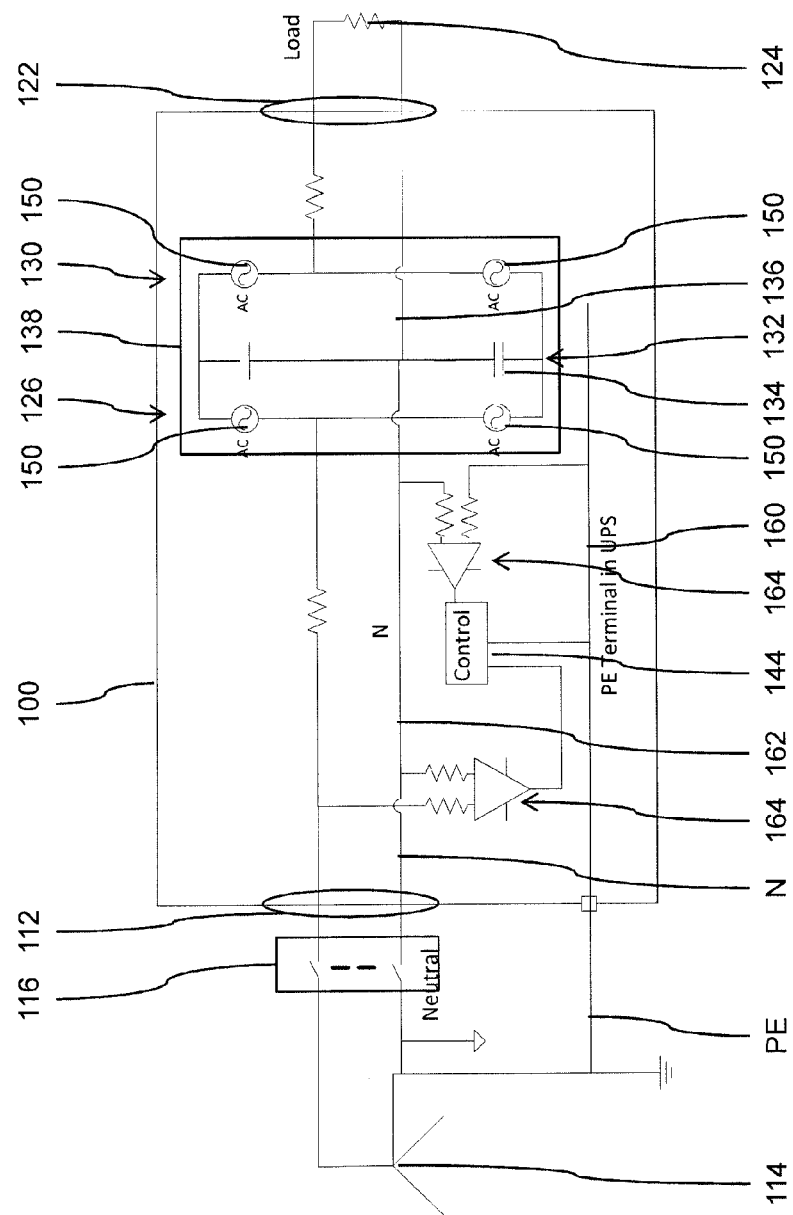
FIG. 8 shows a schematic drawing of an uninterrupted power supply device according to a second embodiment, whereby protected earth is used as internal control reference.

FIG. 8 shows an UPS device 100 according to a second embodiment. The general design and installation is in-line with the UPS device 100 according to the first embodiment. Hence, only differences between the UPS devices of the first and second embodiment will be described in detail. Identical or similar feature will not be described again.

The UPS device 100 of the second embodiment comprises a control unit 144, which controls all components of the UPS device 100. The control unit 144 is connected to protected earth PE. Hence, in this embodiment, protected earth PE is the internal control reference 160 for all voltage measurements. Neutral N serves as secondary control reference 162 in this embodiment.

The UPS device 100 further comprises a measurement unit 164 for measuring a voltage difference between the internal control reference 160 and the secondary control reference 162. The measurement unit 164 is adapted to perform two differential measurements, i.e. a measurement of the voltage between Neutral N and protected earth PE, and one between Neutral N and at least one of the phases of the AC power supply input 112. The differential measurements are subject to only a limited tolerance for common mode.

When the disconnect device 116 disconnects the phases and Neutral N from the UPS device 100, the load 124 is being supported by the DC power supply 120 via the UPS device 100. Accordingly, the power conversion unit 138 will start floating with respect to protected earth PE. The power conversion unit 138 is in danger of collapse due to saturation (common mode) on voltage measurements as a main circuit thereof will drift to a voltage vs. protected earth PE, which is determined by stray impedances.

When the differential measurements result in a voltage bigger than the threshold and the AC power supply 114 is disconnected from the UPS device 100, the control unit 144 of the UPS device 100 triggers the switching unit 170 to interconnect the internal control reference 160 and the secondary control reference 162.

Finally, when the disconnect device 116 is triggered again to connect the phases and Neutral N from the AC power supply to the UPS device 100, also the control unit 144 triggers the switching unit 170 to open and disconnect the internal control reference 160 and the secondary control reference 162.

Figure 9:
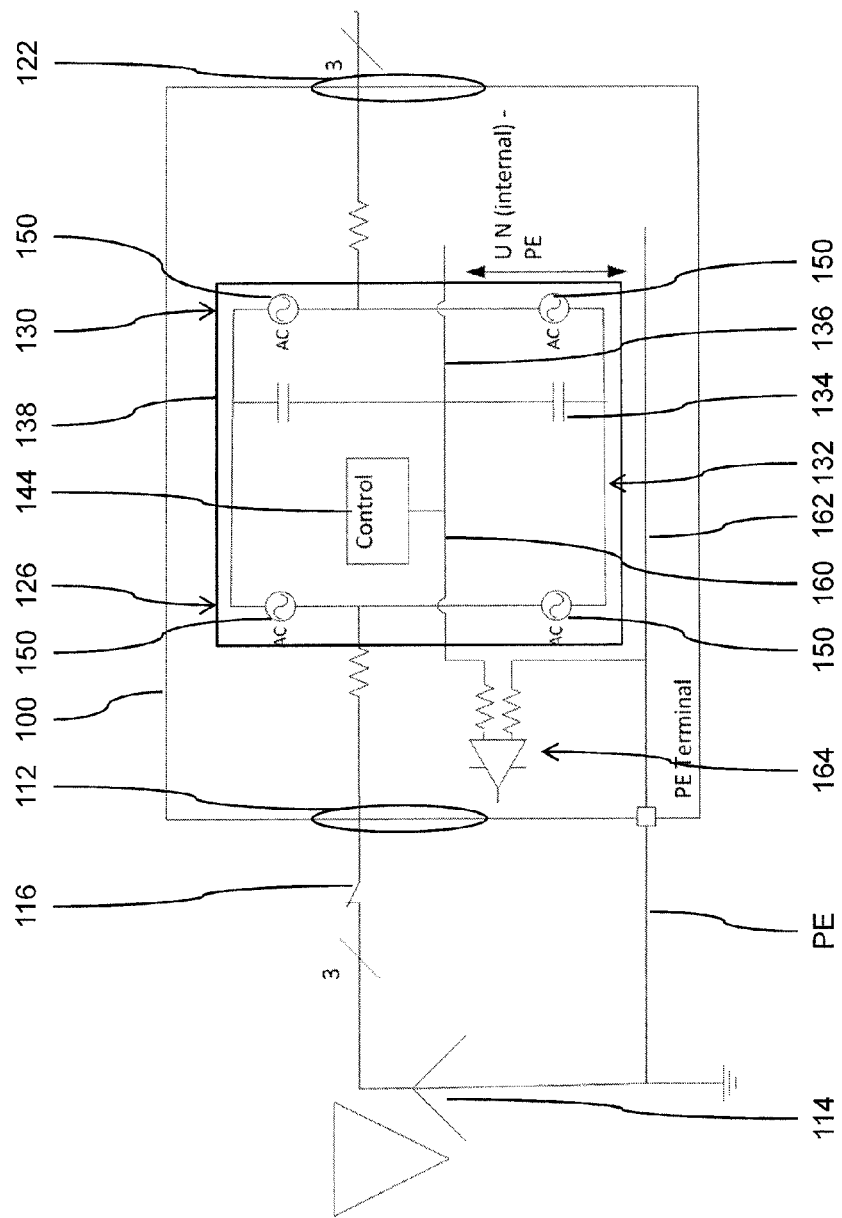
FIG. 9 shows a schematic drawing of an uninterrupted power supply device according to a third embodiment, as connected to a 3-wire AC power supply.
Figure 10:
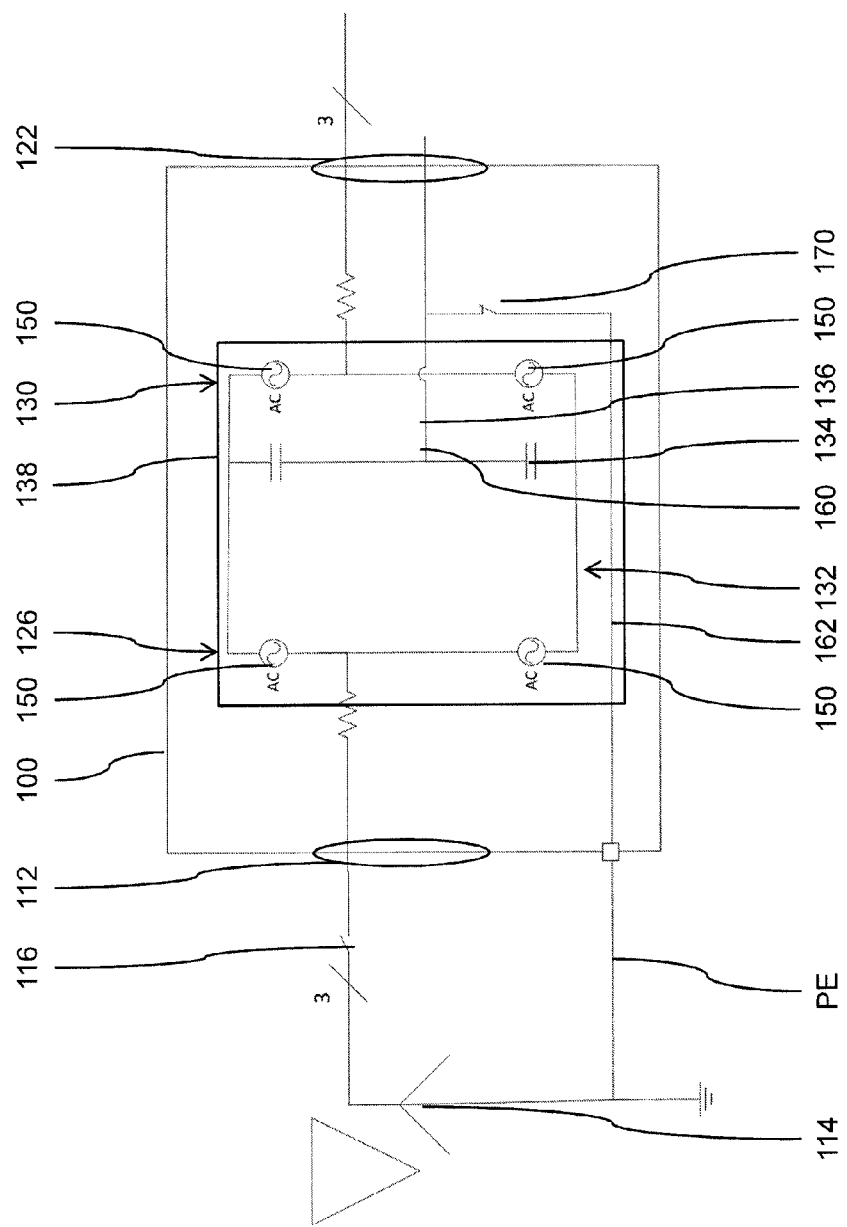
FIG. 10 shows a schematic drawing of the uninterrupted power supply device of the third embodiment in accordance with FIG. 9, whereby the internal control reference is connected via a switching unit to a secondary control reference.

FIGS. 9 and 10 show an UPS device 100 according to a third embodiment. The general design and installation is in-line with the UPS device 100 according to the first and second embodiments. Hence, only differences between the UPS devices of the different embodiment will be described in detail. Identical or similar feature, which have already been discussed earlier in detail, will not be described again.

The UPS device 100 according to the third embodiment comprises an AC power supply input 112, which is connected to an AC power supply 114. The AC power supply 114 is a 3-phase AC power supply. The AC power supply 114 is connected to the AC power supply input 112 via a disconnect device 116, which is provided to disconnect the three phases of the AC power supply 114.

The UPS device 100 shown in FIGS. 9 and 10 comprises a 3-wire installation. A grounded midpoint voltage, i.e. Neutral N, of the AC power supply 114 is not routed to the load 124 according to standard North American installation practice. The UPS device 100 is connected to protected earth PE The UPS device 100 comprises a control unit 144, which controls all components of the UPS device 100. The control unit 144 is connected to a midpoint 136 of the DC link 132 as internal control reference 160, which is during normal operation very close to source midpoint at protected earth PE. The UPS device 100 is further connected to protected earth PE, which serves as secondary control reference 162 in this embodiment.

In normal operation, which is shown in FIG. 9, the disconnect device 116 keeps the AC power supply 114 connected to the UPS device 100. Hence, the midpoint 136 of the DC link 132 is set by the control unit 144 via AC/DC converter 126 very close to source midpoint at protected earth PE. A voltage U N-PE in this embodiment refers to a voltage between internal control reference 160, which is the internal Neutral N, and the secondary control reference 162, which is protected earth PE. This voltage U N-PE is practically zero due to control performed at the AC/DC converter 126. Hence, the voltage U N-PE is below the threshold. Also the three phases of the AC power supply are within a set thresholds.

Upon disconnect of the AC power supply via the disconnect device 116, as shown in FIG. 10, the load 124 is supported by DC power supply 120. The output of power conversion unit 138 floats on stray impedances and the UPS device 100 is in effect operated as an IT-system. A reference of load 124 is lost. The switching unit 170 is operated as described before with reference to the first embodiment.

Figure 11:
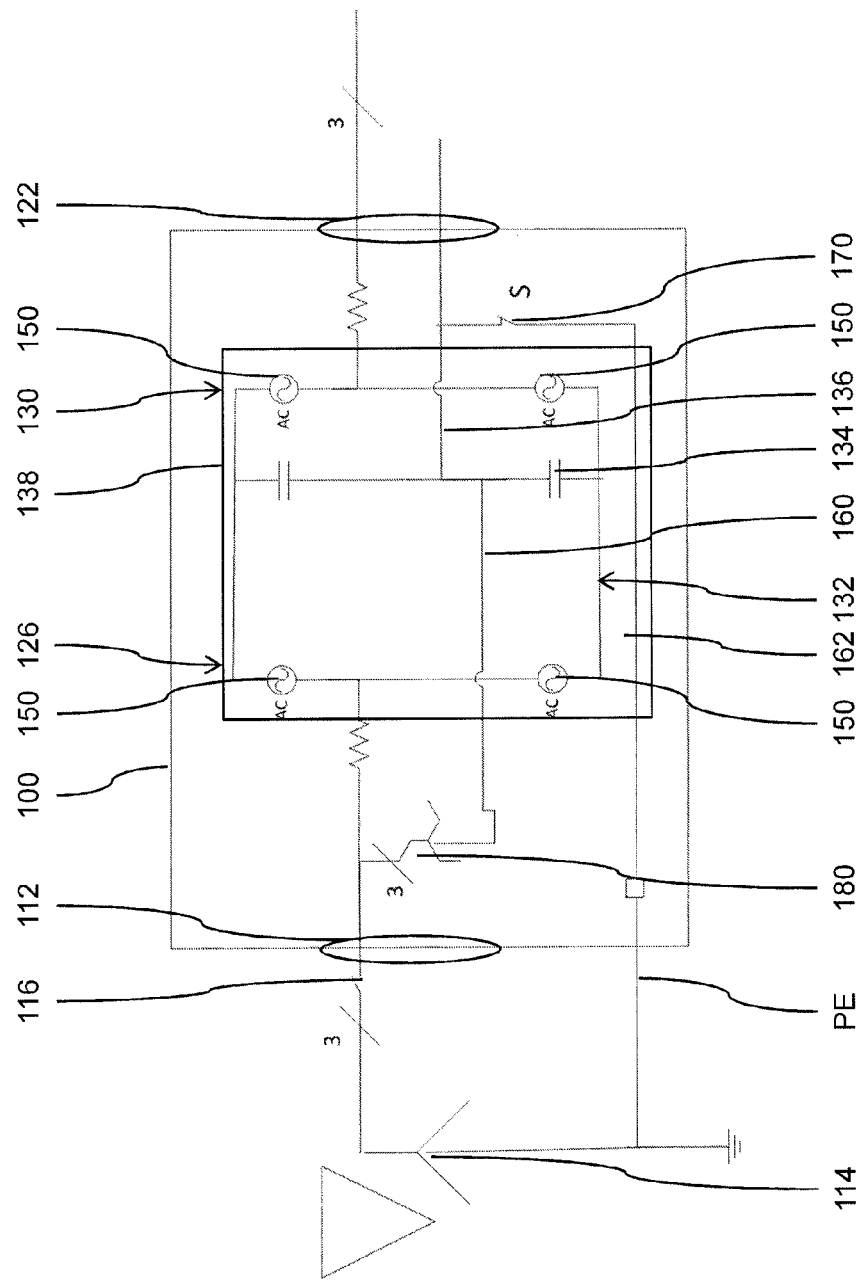
FIG. 11 shows a schematic drawing of an uninterrupted power supply device according to a fourth embodiment, as connected to a S-wire AC power supply, with an internally generated neutral.

FIG. 11 shows an UPS device 100 according to a fourth embodiment. The general design and installation is in-line with the UPS device 100 according to the third embodiment.

Hence, only differences between the UPS devices of the fourth and third embodiments will be described in detail. Identical or similar feature, which have already been discussed earlier in detail, will not be described again.

The UPS device 100 according to the fourth embodiment differs from that of the third embodiment in the internal control reference 160. The UPS device 100 comprises neutral generating means 180 for locally generating a neutral N within the power conversion unit 138 of the UPS device 100. The neutral generating means 180 in this embodiment comprise a zigzag transformer. The locally generated Neutral N is independent from an AC power supply 114 connected to the AC power supply input 112. The locally generated Neutral N is used as internal control reference 160. According to the fourth embodiment, protected earth PE is used as secondary control reference 162.

The operation of the UPS device 100 of the fourth embodiment is as described above in respect to the third embodiment.

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS LIST 10 uninterrupted power supply device, UPS device (State of the Art)
12 AC power supply input (State of the Art)
14 AC power supply (State of the Art)
16 disconnect device (State of the Art)
18 DC power supply input (State of the Art)
20 DC power supply (State of the Art)
22 power output (State of the Art)
24 load (State of the Art)
26 AC/DC converter (State of the Art)
28 DC/DC converter (State of the Art)
30 DC/AC converter, inverter (State of the Art)
32 DC link (State of the Art)
34 storage capacitor (State of the Art)
38 power conversion unit (State of the Art)
39 bypass connection (State of the Art)
40 bypass switch (State of the Art)
41 alternate AC power supply (State of the Art)
42 switch (State of the Art)
44 control unit (State of the Art)
46 user interface and communication interface (State of the Art)
100 uninterrupted power supply device, UPS device
112 AC power supply input
114 AC power supply
116 disconnect device
118 DC power supply input
120 DC power supply
122 power output
124 load
126 AC/DC converter
128 DC/DC converter
130 DC/AC converter, inverter
132 DC link
134 storage capacitor
136 midpoint
138 power conversion unit
144 control unit
150 semiconductor switch
152 IGBT
154 diode
160 internal control reference
162 secondary control reference
164 measuring unit
170 switching unit
172 dV/dt limiting device
174 voltage limiting device
176 passive impedance
178 current measurement device
180 neutral generating means
200 uninterrupted power supply system, UPS system
202 AC power bus
204 DC power bus
206 load power bus
208 communication bus
N Neutral
PE protected earth

The invention claimed is:

1. Uninterrupted power supply device comprising
an at least 3-phase AC power supply input for connection of an AC power supply,
a DC power supply input for connection of a DC power supply,
a power output for connection of a load,
a power conversion unit, which interconnects the AC power supply input, the DC power supply input and the power output, and
an internal control reference for the power conversion unit,
wherein
the uninterrupted power supply device comprises
a secondary control reference,
a measurement unit for measuring a voltage difference between the internal control reference and the secondary control reference, and
a switching unit for connecting the internal control reference to the secondary control reference, whereby
the switching unit connects the internal control reference to the secondary control reference when the measured voltage difference is bigger than a threshold voltage and the AC power supply is disconnected from the uninterrupted power supply device.

2. Uninterrupted power supply device according to claim 1,
wherein
the internal control reference is a reference out of one of the phases of the power output, one of the phases of the AC power supply input, internal load reference, installation neutral (N), an internal DC voltage, or system protective earth (PE)/ground.

3. Uninterrupted power supply device according to claim 2, wherein the switching unit has a current carrying capability of up to a current carrying capability of one phase of the AC power supply input.

4. Uninterrupted power supply device according to claim 2, wherein the secondary control reference is a reference out of system protective earth (PE)/ground, neutral (N) of an alternative AC power supply not connected to the AC power supply input, load reference of another system or source, a phase voltage of an alternative AC power supply not connected to the AC power supply input, or a DC voltage of another system or source.

5. Uninterrupted power supply device according to claim 4, wherein the switching unit comprises a bi-directional electronic switching device or an electromechanical switching device, in particular a contactor or a relay.

6. Uninterrupted power supply device according to claim 2, wherein the switching unit comprises a bi-directional electronic switching device or an electromechanical switching device, in particular a contactor or a relay.

7. Uninterrupted power supply device according to claim 1,
wherein
the secondary control reference is a reference out of system protective earth (PE)/ground, neutral (N) of an alternative AC power supply not connected to the AC power supply input, load reference of another system or source, a phase voltage of an alternative AC power supply not connected to the AC power supply input, or a DC voltage of another system or source.

8. Uninterrupted power supply device according to claim 7, wherein the switching unit comprises a bi-directional electronic switching device or an electromechanical switching device, in particular a contactor or a relay.

9. Uninterrupted power supply device according to claim 1,
wherein
the switching unit comprises a bi-directional electronic switching device or an electromechanical switching device, in particular a contactor or a relay.

10. Uninterrupted power supply device according to claim 1,
wherein
the switching unit has a current carrying capability of up to a current carrying capability of one phase of the AC power supply input.

11. Uninterrupted power supply device according to claim 1,
wherein
the switching unit comprises a current measurement device for measuring a current through the switching unit.

12. Uninterrupted power supply device according to claim 1,
wherein
the uninterrupted power supply device comprises at least one of a dV/dt limiting device, a voltage limiting device, and/or a passive impedance, which are connected in parallel to the switching unit.

13. Uninterrupted power supply device according to claim 1,
wherein
the uninterrupted power supply device comprises neutral generating means for locally generating a neutral (N) within the uninterrupted power supply device and independent from an AC power supply connected to the AC power supply input.

14. Uninterrupted power supply system comprising at least two uninterrupted power supply devices according to claim 1, whereby the at least two uninterrupted power supply devices are connected in parallel for connection between an AC power supply and a load.

15. Uninterrupted power supply system according to claim 14,
wherein
the uninterrupted power supply system is adapted to perform a central measurement of the voltage difference between the internal control reference and the secondary control reference, and
the switching units of the at least two uninterrupted power supply devices commonly connect the internal control references to the secondary control references when the centrally measured voltage difference is bigger than the threshold voltage and the AC power supply is disconnected from the respective uninterrupted power supply devices.

16. Uninterrupted power supply system according to claim 14,
wherein
the uninterrupted power supply system comprises a DC power bus, and
the DC power supply input of the at least two uninterrupted power supply devices is commonly connected via the DC power bus to the DC power supply.

17. Uninterrupted power supply system according to claim 14,
wherein
the uninterrupted power supply system comprises a system switching unit for connecting the internal control reference to the secondary control reference, whereby
the system switching unit connects the internal control reference to the secondary control reference when the measured voltage difference is bigger than a threshold voltage and the AC power supply is disconnected from the uninterrupted power supply system.

18. Uninterrupted power supply system comprising
an at least 3-phase system AC power supply input for connection of an AC power supply,
a system DC power supply input for connection of a DC power supply,
a system power output for connection of a load,
at least two uninterrupted power supply devices, which interconnect the system AC power supply input, the system DC power supply input and the system power output, and
an internal system control reference for the at least two uninterrupted power supply devices,
wherein
the uninterrupted power supply system comprises
a secondary system control reference,
a system measurement unit for measuring a voltage difference between the internal system control reference and the secondary system control reference, and
a system switching unit for connecting the internal system control reference to the secondary system control reference, whereby
the system switching unit connects the internal system control reference to the secondary system control reference with the measured voltage difference is bigger than a threshold voltage and the AC power supply is disconnected from the uninterrupted power supply system.

19. Method for operation of an uninterrupted power supply device, whereby the uninterrupted power supply device comprises
an at least 3-phase AC power supply input for connection of an AC power supply,
a DC power supply input for connection of a DC power supply,
a power output for connection of a load, a power conversion unit, which interconnects the AC power supply input, the DC power supply input and the power output, and an internal control reference for the power conversion unit, comprising the steps of providing a secondary control reference, measuring a voltage difference between the internal control reference and the secondary control reference, and connecting the internal control reference to the secondary control reference when the measured voltage difference is bigger than a threshold voltage and the AC power supply is disconnected from the uninterrupted power supply device.

20. Method according to claim 19, comprising the additional step of disconnecting the internal control reference from the secondary control reference when the measured voltage difference falls below the threshold voltage and/or the AC power supply is connected to the uninterrupted power supply device.

* * * * *